United States Patent
Hayasaka

[11] Patent Number: 6,122,750
[45] Date of Patent: Sep. 19, 2000

[54] APPARATUS FOR, AND METHOD OF, ISOLATING HARDWARE AND POWER SOURCE PROBLEMS

[75] Inventor: Hisashi Hayasaka, Kawasaki, Japan

[73] Assignee: Fujitsu Limited, Kawasaki, Japan

[21] Appl. No.: 09/119,776

[22] Filed: Jul. 21, 1998

[30] Foreign Application Priority Data

Dec. 26, 1997 [JP] Japan ................................ 9-359105

[51] Int. Cl.[7] .............................. G06F 1/28; G06F 1/26; G06F 11/34
[52] U.S. Cl. ......................... 713/340; 713/300; 714/14; 714/25; 702/187
[58] Field of Search .................... 713/300, 323, 713/340, 320; 709/224; 714/39, 43, 47, 14, 24, 25; 710/260; 324/433; 340/636; 307/64, 66; 365/226; 379/102.04; 361/79; 702/182, 183, 187

[56] References Cited

U.S. PATENT DOCUMENTS

| 5,287,363 | 2/1994 | Wolf et al. | 714/718 |
|---|---|---|---|
| 5,410,713 | 4/1995 | White et al. | 713/330 |
| 5,428,766 | 6/1995 | Seaman | 709/215 |
| 5,442,679 | 8/1995 | Regis et al. | |
| 5,579,524 | 11/1996 | Kikinis | 713/324 |
| 5,684,404 | 11/1997 | Millar | 324/426 |
| 5,903,767 | 5/1999 | Little | 713/323 |

*Primary Examiner*—Gopal C. Ray
*Attorney, Agent, or Firm*—Armstrong, Westerman, Hattori, McLeland & Naughton

[57] ABSTRACT

An apparatus is installed in a portable terminal to isolate hardware and power source problems and to quickly find the cause of a given problem occurring in the terminal. In the apparatus, a monitoring circuit (1) monitors and measures the voltages of power sources of the terminal at predetermined intervals. A memory (2) keeps a log of the measured voltages. An output circuit (3) provides the log outside. A controller (4) controls the monitoring circuit, memory, and output circuit and provides the log outside in response to a request. The monitoring circuit, memory, output circuit, and controller are energized by a backup power source of the terminal.

11 Claims, 15 Drawing Sheets

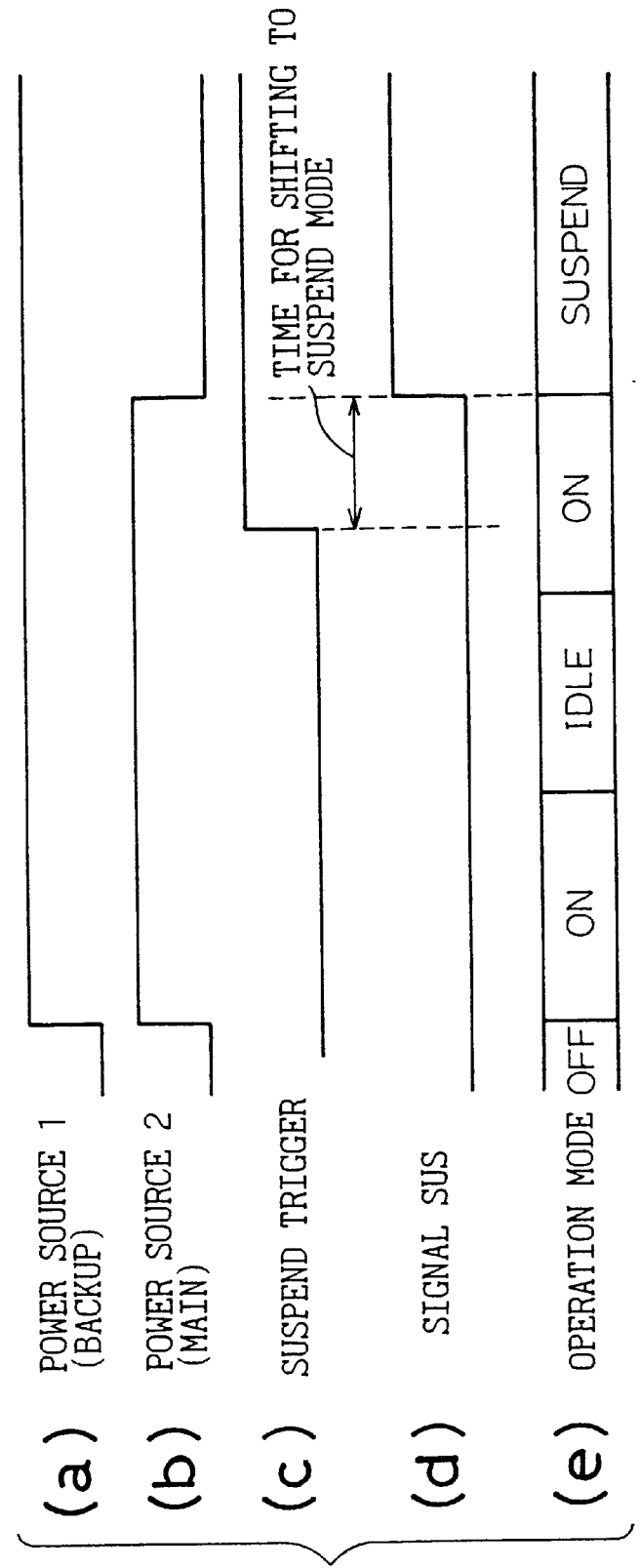

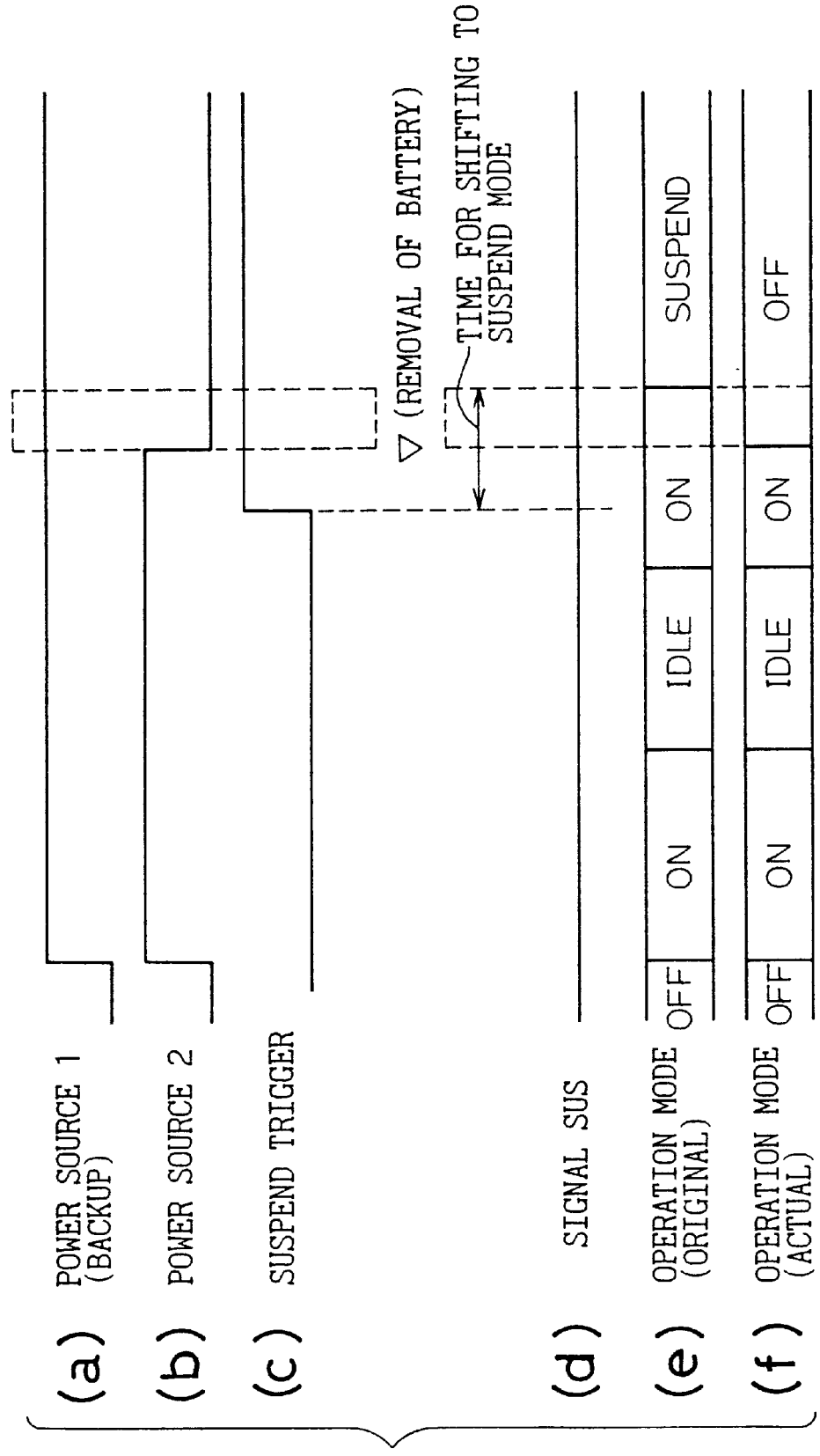

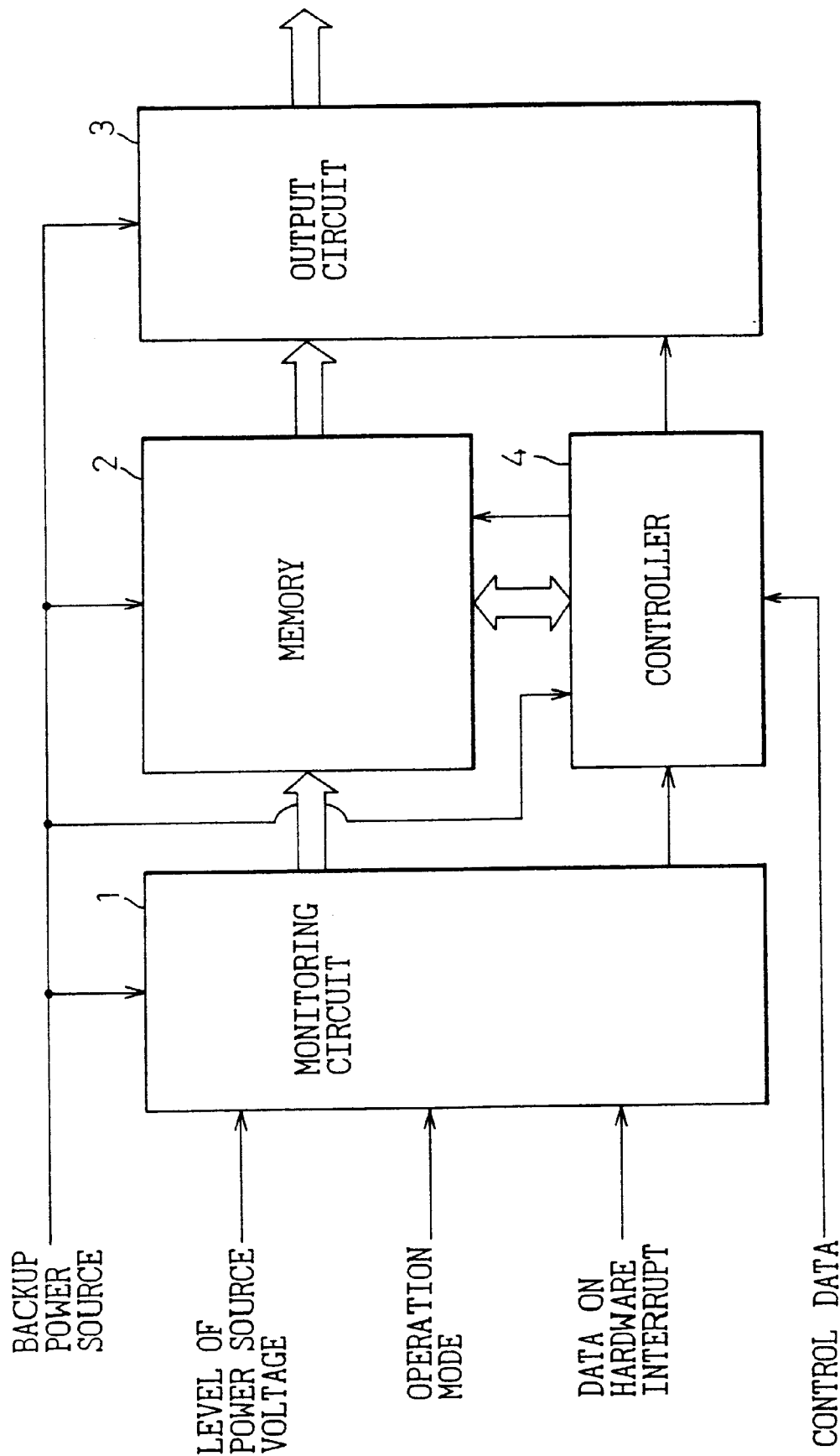

APPARATUS FOR, AND METHOD OF, ISOLATING HARDWARE AND POWER SOURCE PROBLEMS

BACKGROUND OF THE INVENTION

1. Field of the Invention

The present invention relates to an apparatus for, and a method of, isolating problems, and particularly, to an apparatus for, and a method of, isolating hardware and power source problems occurring in, for example, a portable terminal.

2. Description of the Related Art

The sizes of IC elements are being reduced and the integration and performance of LSIs and CPUs are improving. These factors are enlarging the markets for personal-computer communications, the Internet, and portable terminals such as cellular phones, notebook computers, handy terminals, and mobile computers.

The portable terminals are easy to carry and are usable anywhere. They are, therefore, frequently manipulated by unskilled persons in, for example, supermarkets, to manage inventories.

The unskilled persons sometimes carry out irregular operations such as removing batteries from active terminals to destroy data and programs stored in the terminals. The terminals themselves sometimes have hardware problems and malfunction under specific conditions and, in particular, when they are new products.

When a problem occurs in a terminal, it is very difficult for the operator to correctly report conditions that caused the problem, and it takes a long time and much labor to discover the cause of the problem. To cope with this, a prior art keeps a log of software execution. Whenever a problem occurs, the log is checked to locate the point or subroutine in a program that caused the problem.

If the operator of a terminal makes an irregular operation such as removing batteries from the terminal while a main memory of the terminal is executing a program, data in the memory will be destroyed and a log therein disappears at once. Namely, the prior art's logging function is useless in such a case.

Except for the software logging function, the prior art has no means to directly record the operations of the power source and other hardware parts of the terminal. The prior art needs, therefore, a long time and much labor to isolate problems relating to the power source, hardware, and irregular operations of the terminal from bugs in the software of the terminal. This is the reason why there is a strong demand from hardware designers and maintenance personnel for an apparatus for, and a method of, isolating hardware and power source problems.

SUMMARY OF THE INVENTION

An object of the present invention is to provide an apparatus for and a method of isolating hardware and power source problems and problems due to irregular operations, to quickly find the cause of a given problem.

In order to accomplish the object, the present invention provides an apparatus, installed in a device, for isolating a power source problem occurred in the device. The apparatus has a monitoring circuit for monitoring and measuring the voltages of power sources of the device, a memory for keeping a log of the measured voltages, an output circuit for providing the log outside, and a controller for controlling the monitoring circuit, memory, and output circuit and providing the log outside in response to a request. The monitoring circuit, memory, output circuit, and controller are energized by a backup power source of the device.

The monitoring circuit may monitor and collect data on operation modes and, in particular, the power-saving modes of the device. The memory may store the data on operation modes in such a way as to temporally align the data with the log of measured voltages. The output circuit may provide the log of measured voltages and the data on operation modes outside in response to an instruction from the controller.

The monitoring circuit may monitor and collect data on hardware interrupts that switch the operation modes and, in particular, the power-saving modes of the device from one to another. The memory may store the data on hardware interrupts in such a way as to temporally align the data with the log of measured voltages. The output circuit may provide the log of measured voltages and the data on hardware interrupts outside in response to an instruction from the controller.

The present invention also provides an apparatus, installed in a device, for isolating a hardware problem occurred in the device. The apparatus has a monitoring circuit for monitoring and collecting data on interrupts that control the operations of hardware of the device, a memory for storing a log of the data on interrupts, an output circuit for providing the log outside, and a controller for controlling the monitoring circuit, memory, and output circuit and providing the log outside in response to a request. The monitoring circuit, memory, output circuit, and controller are energized by a backup power source of the device.

The memory may have a buffer circuit for storing data relating to problems including failure sequences. The buffer circuit may be a nonvolatile memory.

The present invention also provides a method of isolating a power source problem that have occurred in a device. The method includes the steps of monitoring and measuring the voltages of power sources of the device, keeping a log of the measured voltages, and providing the log outside in response to a predetermined instruction.

The method may include the steps of monitoring and collecting data on operation modes, in particular, power-saving modes of the device, storing the data on operation modes in such a way as to temporally align the data with the log of measured voltages, and providing the log of measured voltages and the data on operation modes outside in response to a predetermined instruction.

The method may include the steps of monitoring and collecting data on hardware interrupts that switch the operation modes and, in particular, the power-saving modes of the device from one to another, storing the data on hardware interrupts in such a way as to temporally align the data with the log of measured voltages,-and providing the log of measured voltages and the data on hardware interrupts outside in response to a predetermined instruction. The data on hardware interrupts may include data on interrupts that control the operations of hardware of the device.

The present invention also provides a method of isolating a hardware problem occurred in a portable terminal. The method includes the steps of monitoring and collecting data on interrupts that control the operations of the hardware of the portable terminal, keeping a log of the data on interrupts, and providing the log outside the portable terminal.

BRIEF DESCRIPTION OF THE DRAWINGS

The present invention will be more clearly understood from the description as set forth below with reference to the accompanying drawings, in which:

FIG. 1 shows sequences of shifting to a power-saving mode in a standard portable terminal;

FIG. 2 shows an instance when a battery is removed from the terminal during the shifting sequence of FIG. 1;

FIG. 3 shows an apparatus for isolating hardware and power source problems according to the present invention;

DESCRIPTION OF THE PREFERRED EMBODIMENTS

Figure 4A:
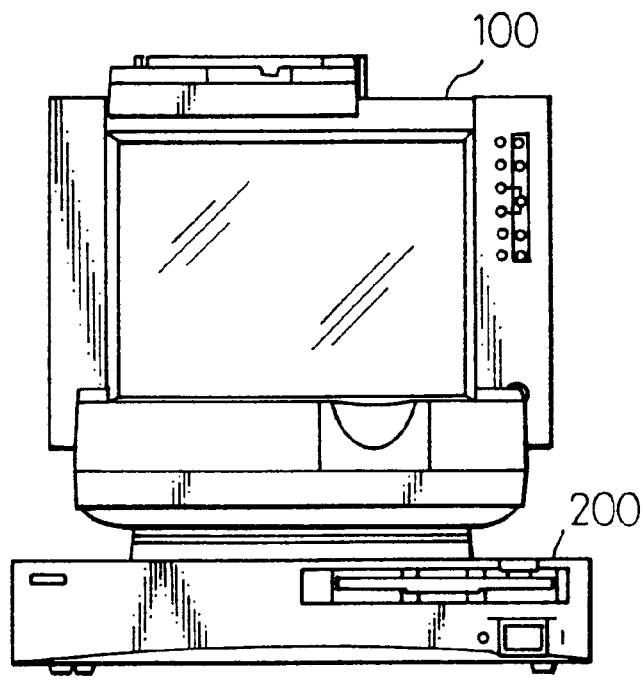
FIG. 4A is a front view showing a portable terminal according to the present invention.

For a better understanding of the preferred embodiments of the present invention, a prior art and the problem thereof will be explained.

FIG. 1 shows sequences of shifting to a power-saving mode in a standard portable terminal.

A sequence (a) shows an on/off operation of a power source 1 that is a backup power source for supplying power to a main memory, control circuits, etc., of the terminal even in a power-saving mode such as a suspend mode.

A sequence (e) shows a usual operation sequence of the terminal. The power source 1 changes its on/off state in response to a main switch (not shown). The power source 1 continuously supplies power to some parts of the terminal during the suspend mode. Display data just before the suspend mode is stored in the main memory that receives power from the power source 1 during the suspend mode. When the suspend mode is switched to a normal mode, the display data is restored.

A sequence (b) shows an on/off operation of a power source 2 that is a main power source for supplying power to every part of the terminal. In the same way as the power source 1, the power source 2 changes its on/off state in response to the main switch. During the suspend mode, the power source 2 stops supplying power to large power consuming parts such as a display and a hard-disk drive in the terminal.

A sequence (c) shows the suspend trigger signal. When the main switch is ON and the terminal is in an ON mode or an idle mode other than the suspend mode, the operator of the terminal may turn on a suspend switch or close a lid of the terminal, to produce a suspend requesting interrupt signal. The interrupt signal starts a suspend sequence (d) to activate a suspend signal SUS after a predetermined period. The suspend signal SUS starts the suspend mode, as shown in the sequence (e).

An idle mode in the sequence (e) starts if there is no input to the terminal for a predetermined period through push buttons, control keys, etc. The idle mode temporarily stops power to the hard-disk drive and CPU of the terminal. If an interrupt occurs thereafter by, for example, pushing a key, the idle mode shifts to the normal mode. The idle mode is an intermediate power-saving mode between the normal mode and the suspend mode.

FIG. 2 shows an instance when the operator mistakenly removes a battery (the power source 2) from the terminal during the period prior to the suspend mode.

In this case, a sequence (f) takes place instead of the normal sequence (e). The main switch is forcibly turned off in the sequence (f). This instantaneously eliminates display data to be stored in the main memory and the contents of registers in control circuits that receive power from the power source 1. The software logging function of the prior art is useless in this case. It is necessary, therefore, to provide means for isolating problems relating to hardware, power sources, and an operator's irregular operations.

FIG. 3 shows an apparatus for isolating hardware and power source problems according to the present invention. In the following explanation, the apparatus of the present invention is applied to a portable terminal.

The apparatus has a monitoring circuit 1 for monitoring power source voltages, operation modes and, in particular, power-saving modes, and hardware interrupts. A memory 2 keeps a log of data monitored by the monitoring circuit 1.

An output circuit 3 provides the log outside in response to a request. A controller 4 controls the monitoring circuit 1, memory 2, and output circuit 3 according to internal control sequences and external control data.

In this way, the present invention monitors the levels of power source voltage, operation modes, and hardware interrupts, stores a log of the monitored data, and provides the log when a problem occurs, to isolate a hardware problem of which the reproducibility is low.

The embodiments of the present invention will be explained with reference to FIGS. 4A to 15.

Figure 4B:
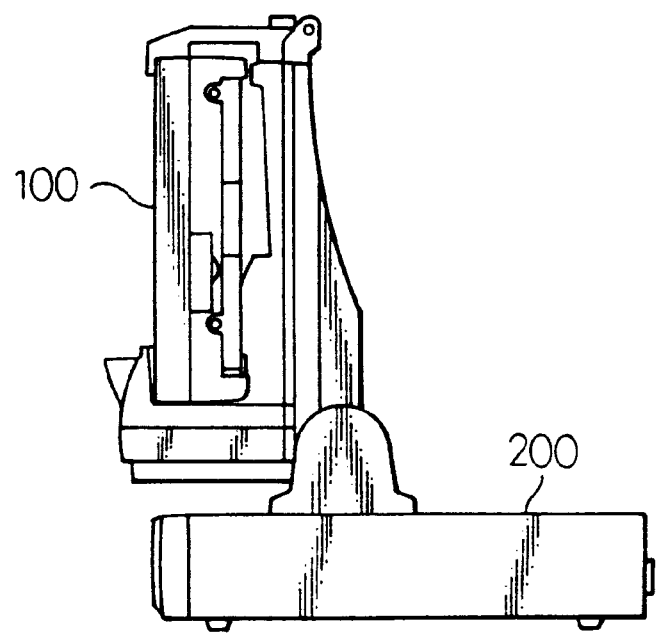
FIG. 4B is a side view showing the portable terminal of FIG. 4A.
Figure 5:
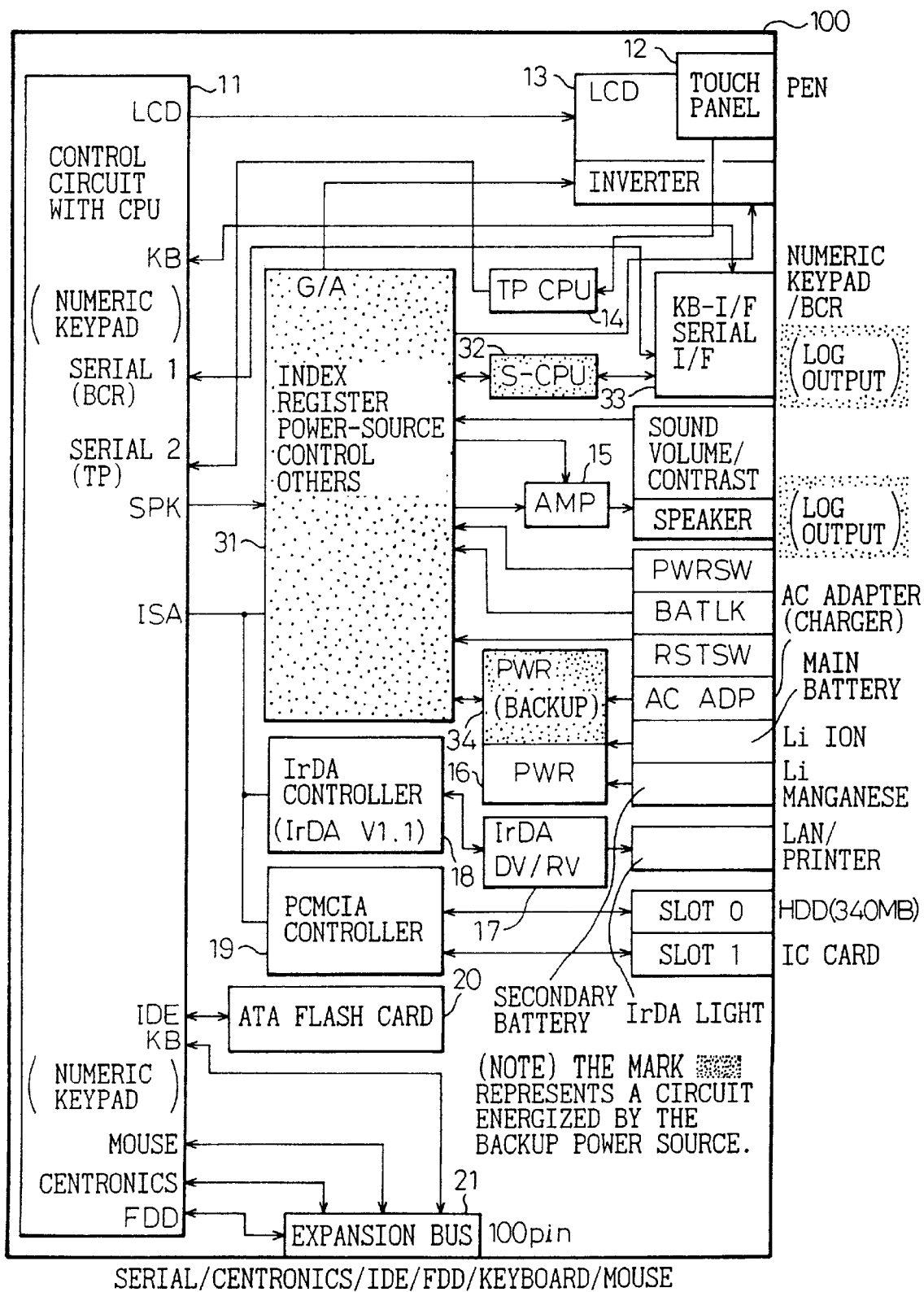
FIG. 5 shows circuit blocks incorporated in the terminal of FIGS. 4A and 4B.

FIGS. 4A and 4B show a portable terminal, according to an embodiment of the present invention, in which FIG. 4A is a front view and FIG. 4B a side view. FIG. 5 shows circuit blocks incorporated in the terminal of FIGS. 4A and 4B.

In FIGS. 4A and 4B, the terminal 100 is docked with a personal computer 200. The terminal 100 has a large touch panel and an interface connected to the personal computer 200, which processes data for the terminal 100.

In FIG. 5, the terminal 100 has a control circuit 11 having a CPU to control the whole of the terminal 100. The touch panel 12 is used by an operator to control the terminal 100 and display data. The touch panel 12 is controlled by a touch panel CPU (TP CPU) 14. An LCD 13 displays the states of the terminal 100. A power source (PWR) 16 is a battery to supply power. An IrDA transmitter-receiver (IrDA DR/RV) 17 carries out infrared communication with an external device under the control of an IrDA controller 18. A PCMCIA controller 19 interfaces the terminal 100 with PCMCIA cards in slots 0 and 1. An ATA flash-card unit 20 provides an IDE interface to a flash card. An expansion bus 21 is used to dock the terminal 100 with the personal computer 200.

The terminal 100 has the apparatus of the present invention for isolating hardware and power source problems. The apparatus consists of a gate array (G/A) 31, a sub-CPU (S-CPU) 32, a backup power source 34, and a serial interface 33. The gate array 31 is an exclusive-use LSI designed to control power sources. The sub-CPU 32 collects data relating to hardware problems, in particular, power source problems through the gate array 31, edits the collected data, and stores the edited data. The backup power source 34 supplies power to the gate array 31 and sub-CPU 32. The serial interface 33 provides the data in the sub-CPU 32 outside. The right side of the terminal 100 has a power source switch (PWRSW), a battery lock (BATLK), a reset switch (RSTSW), and an AC adapter (AC ADP).

Figure 6:
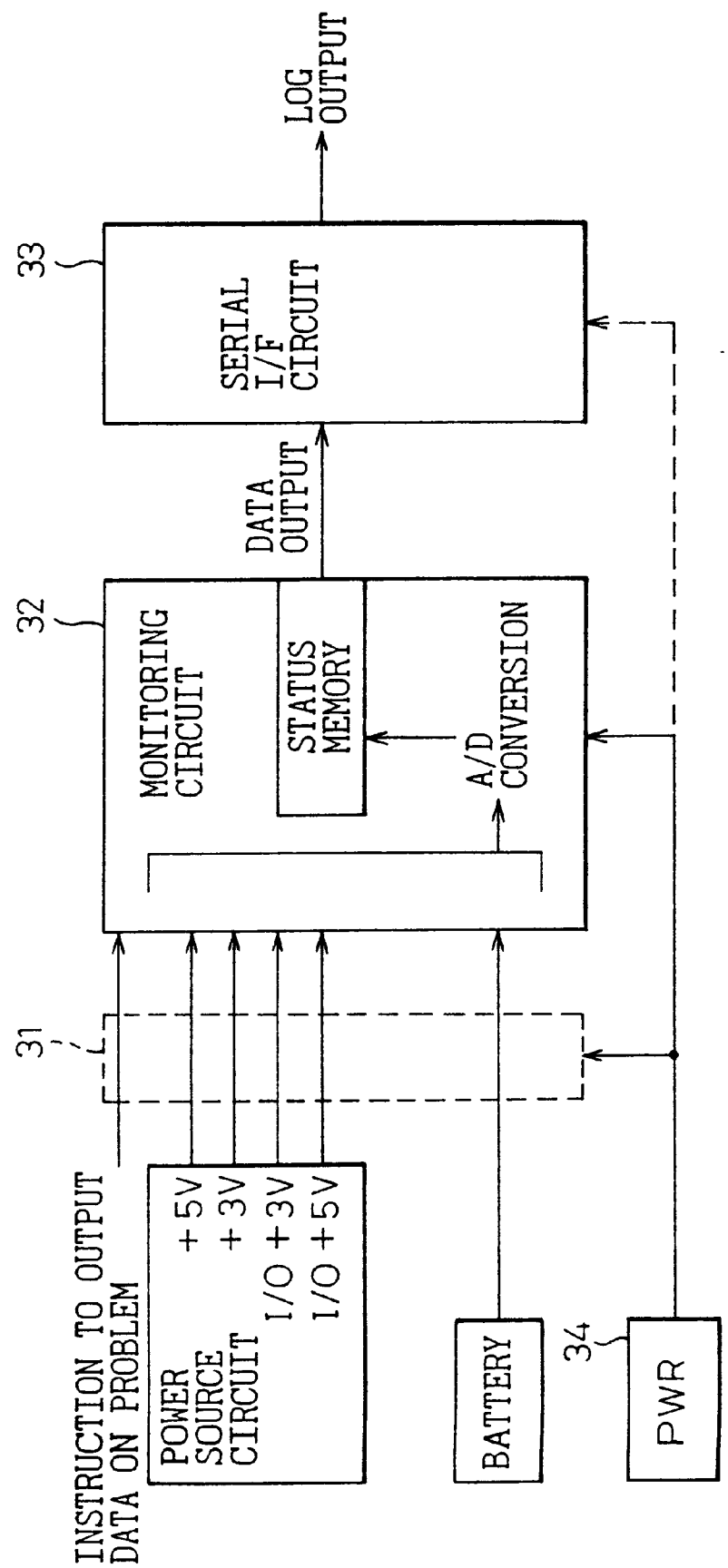
FIG. 6 shows an apparatus for isolating hardware and power source problems according to a first embodiment of the present invention.

FIG. 6 shows an apparatus for isolating hardware and power source problems according to a first embodiment of the present invention. The apparatus is arranged in the terminal 100 of FIG. 5.

A monitoring circuit 32 receives power source voltages such as 5 V and 3 V through a gate array 31, samples the voltages at given intervals, digitizes the sampled values with the use of an A/D converter (not shown) in the monitoring circuit 32, and stores the digital data in a status register or a RAM. In response to an external instruction provided by the operator, the stored data is sent outside through a serial interface 33. The backup power source (PWR) 34 secures the operation of the apparatus of the present invention even if a power source problem occurs.

The monitoring circuit 32 is a single-chip microcomputer (S-CPU). The microcomputer incorporates an A/D converter, a RAM, and a serial communication circuit that work as the A/D converter, status register, and serial interface mentioned above. Accordingly, the serial interface 33 (FIG. 5) may be a simple connector for providing output signals and may not need power sources. Alternatively, the serial interface may be a driver/receiver circuit for driving an external device.

Figure 7:
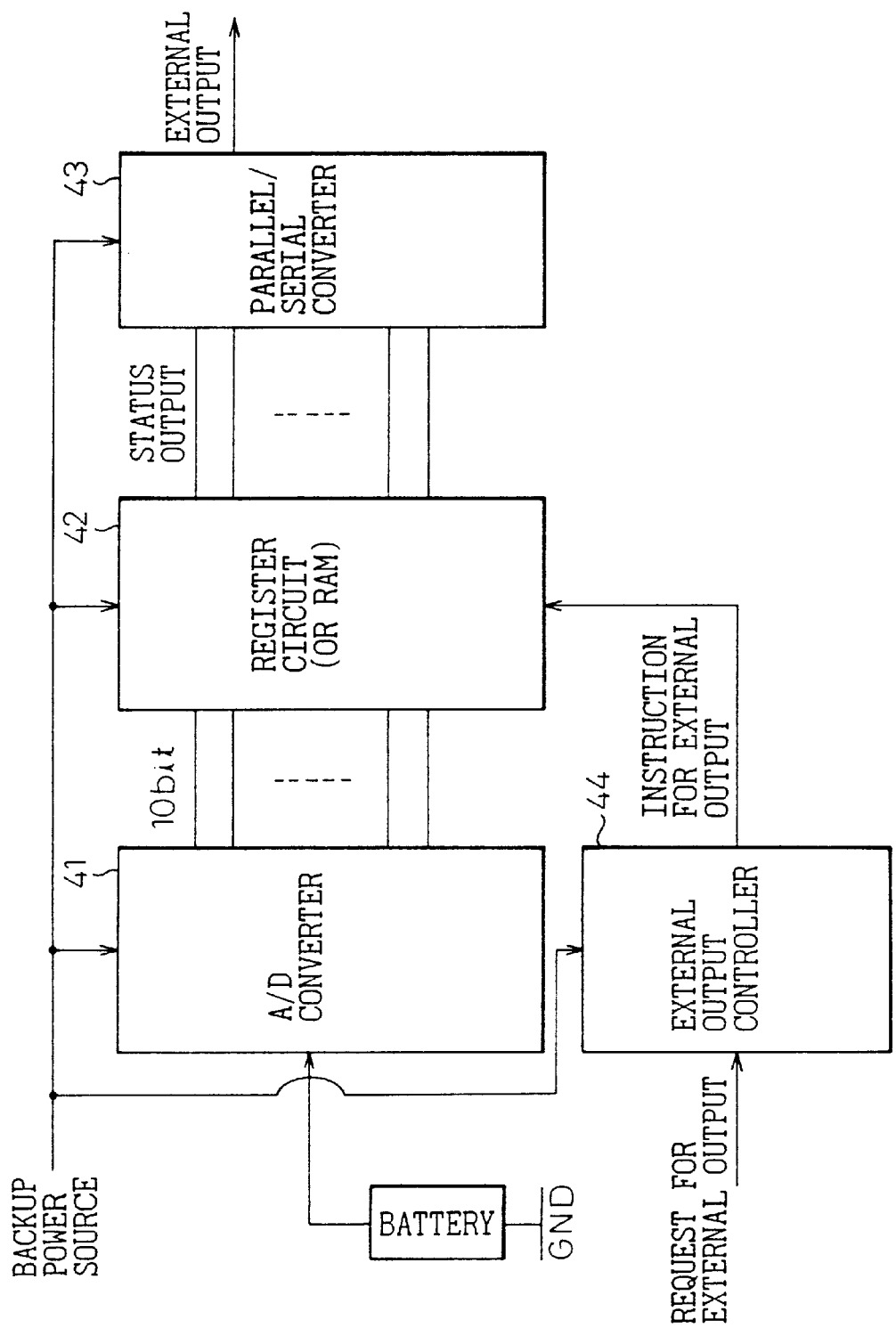
FIG. 7 shows functional blocks of the apparatus of FIG. 6.

FIG. 7 shows functional blocks of the apparatus of FIG. 6.

An A/D converter 41 converts the voltage of a battery into, for example, a 10-bit parallel signal, which is stored in a 10-bit register or RAM 42. In response to an external request provided by the operator, an output controller 44 instructs the register 42 to provide the stored data to a parallel-to-serial converter 43, which provides a serial output signal. In practice, these blocks are realized by the microcomputer (S-CPU) 32, and the blocks transfer data among them through internal data buses. Instead of the serial output signal, a parallel output signal may be provided.

Figure 8:
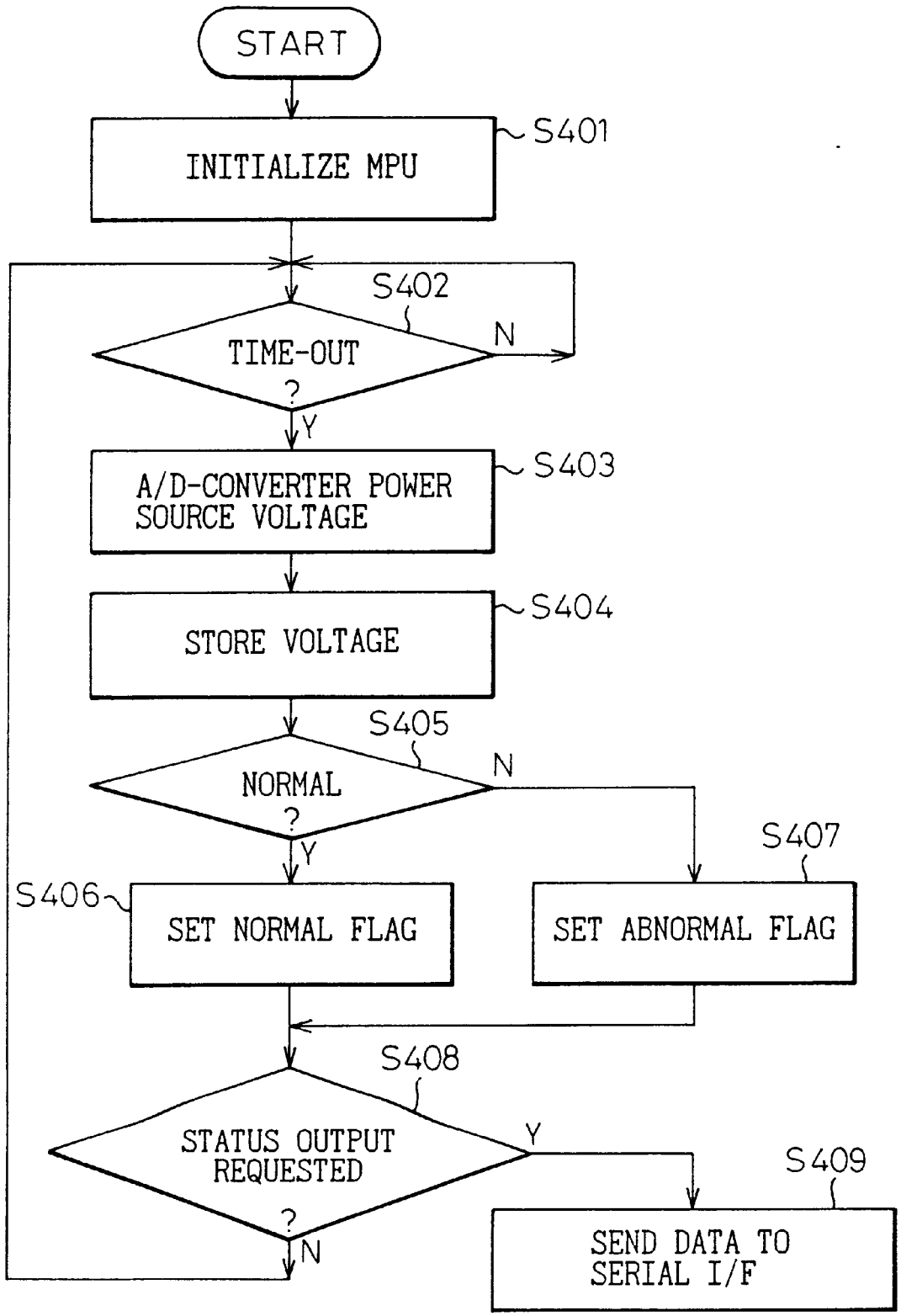
FIG. 8 shows an operational flow of the apparatus of FIG. 6.

FIG. 8 shows an operational flow of the apparatus of FIG. 6.

Step S401 initializes the status register, a timer, etc., of the apparatus. The timer causes a time-out at given intervals to sample power source voltages. Step S402 checks to see if a time-out has occurred. If it has occurred, step S404 converts the sampled voltages into digital values and stores them in the status register or RAM.

Step S405 checks to see if the voltages are within specified ranges. If they are, step S406 sets a normal flag, and if not, step S407 sets an abnormal flag. Step S408 checks to see if there is an external request for a power source status. If not, steps S402 to S408 are repeated, and if there is, step S409 provides the power source status to the outside through the serial interface 33.

Figure 9:
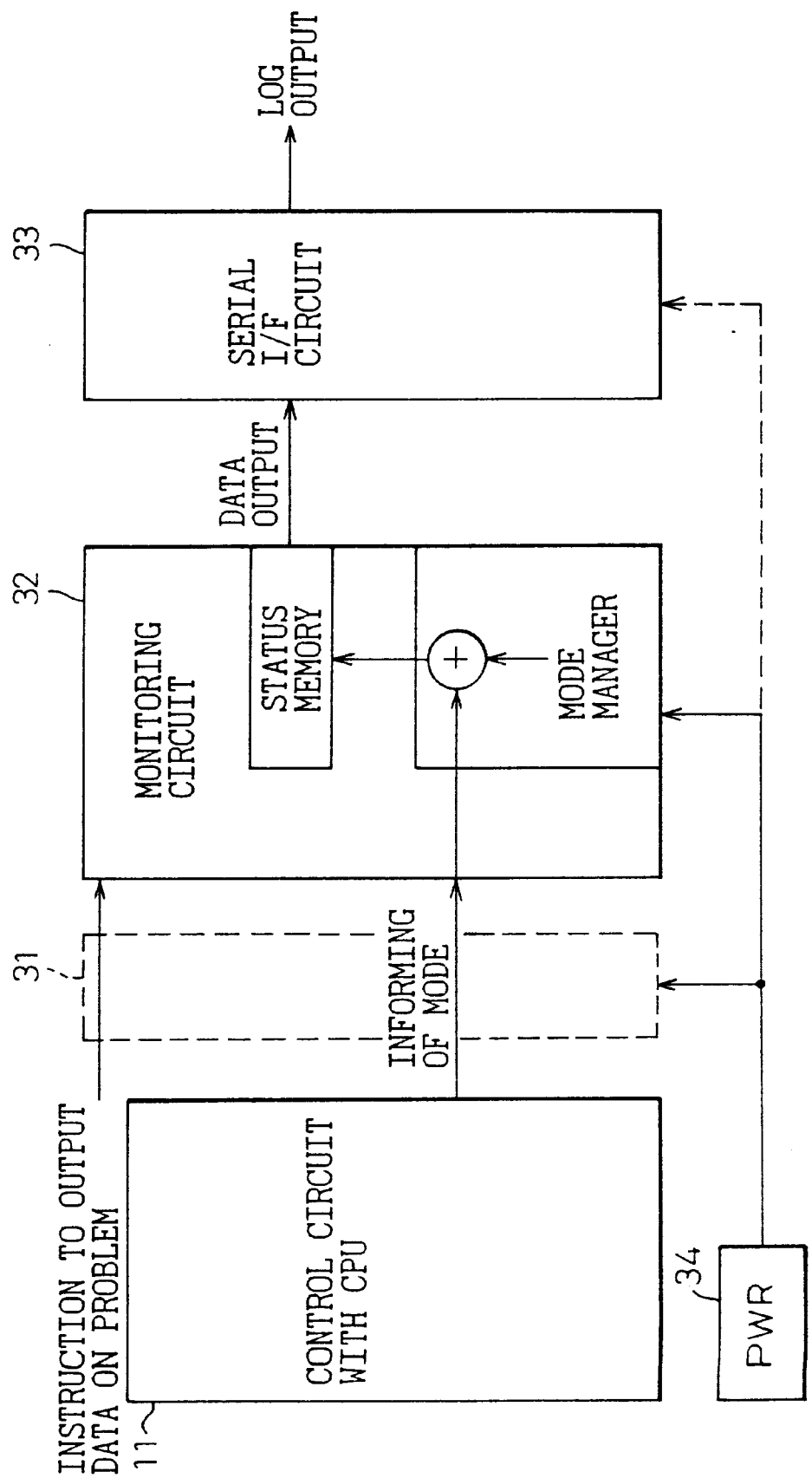
FIG. 9 shows an apparatus for isolating hardware and power source problems according to a second embodiment of the present invention.

FIG. 9 shows an apparatus for isolating hardware and power source problems according to a second embodiment of the present invention. This apparatus is arranged in the terminal 100 of FIG. 5.

The control circuit 11 (FIG. 5) informs a monitoring circuit 32 of an operation mode such as the idle mode or the suspend mode of the sequence (e) of FIGS. 1 and 2.

The monitoring circuit 32 has a mode manager, which stores data on the mode detected by the control circuit 11 in such a way as to temporally align the data with the log of power source voltages (FIG. 6). This embodiment indicates an operation mode of the terminal 100 when a power source problem occurs in the terminal 100. Namely, the embodiment is capable of determining whether or not power mode sequences in the terminal 100 are normal and indicating the cause of a problem occurring during, for example, the suspend mode as shown in the sequence (f) of FIG. 2.

Figure 10:
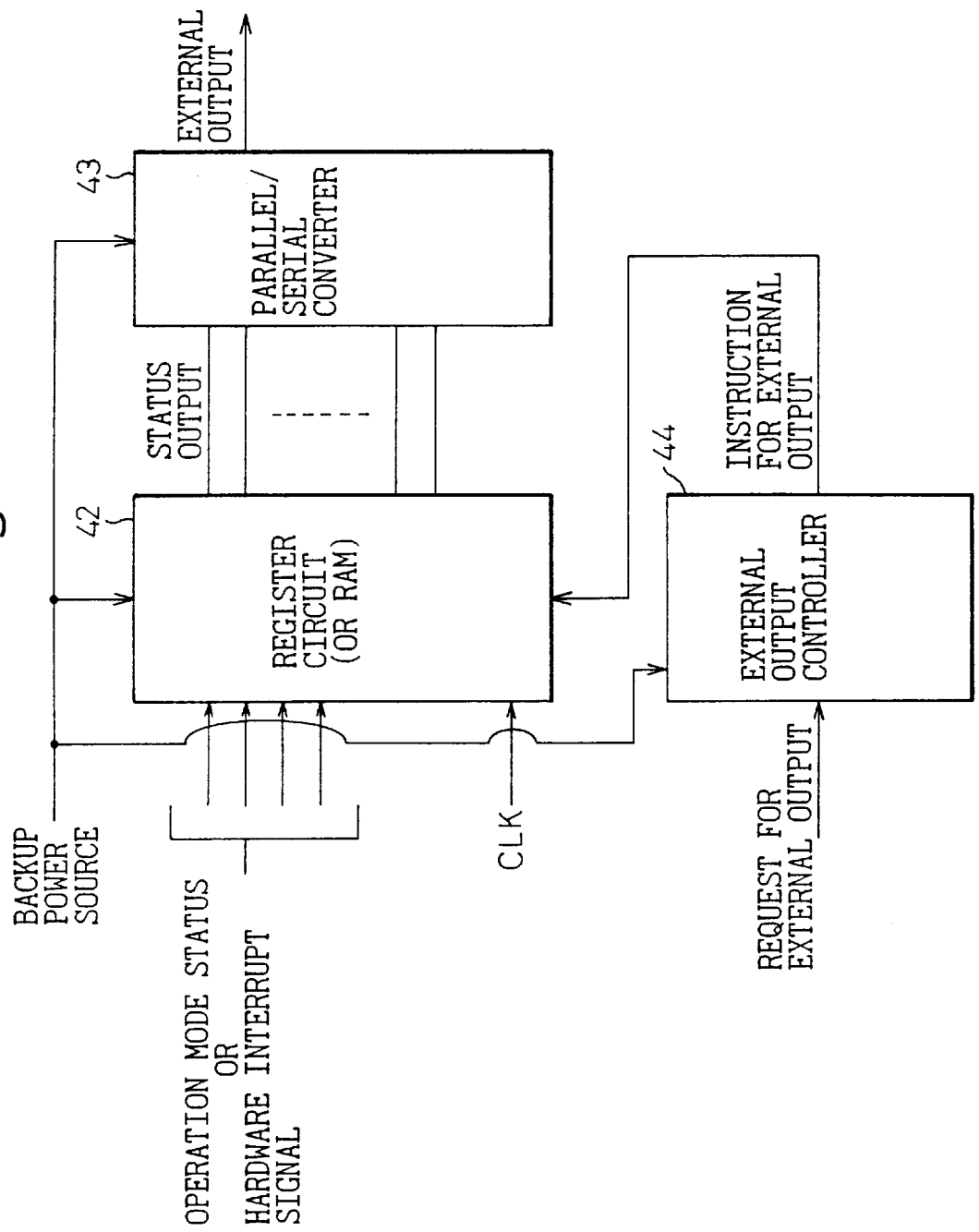
FIG. 10 shows functional blocks of the apparatus of FIG. 9.

FIG. 10 shows functional blocks of the apparatus of FIG. 9.

The monitoring circuit 32 has a register circuit or a RAM 42 for storing a signal representing an operation mode provided by the control circuit 11 (FIG. 9). It is possible to bypass the control circuit 11. Namely, the gate array 31 (FIG. 5) may directly monitor or decode signals in signal and bus lines and generate a signal to indicate an operation mode, which is stored in the RAM 42.

This is advantageous because the gate array 31 can collect an operation mode even if the control circuit 11 stops due to a failure in a main power source. The operation mode stored in the RAM 42 is provided outside through a parallel-to-serial converter 43 in response to an external request issued to investigate the problem. In practice, the blocks of FIG. 10 are realized by the microcomputer (S-CPU) 32, and the blocks transfer data among them through internal data buses.

Figure 11:
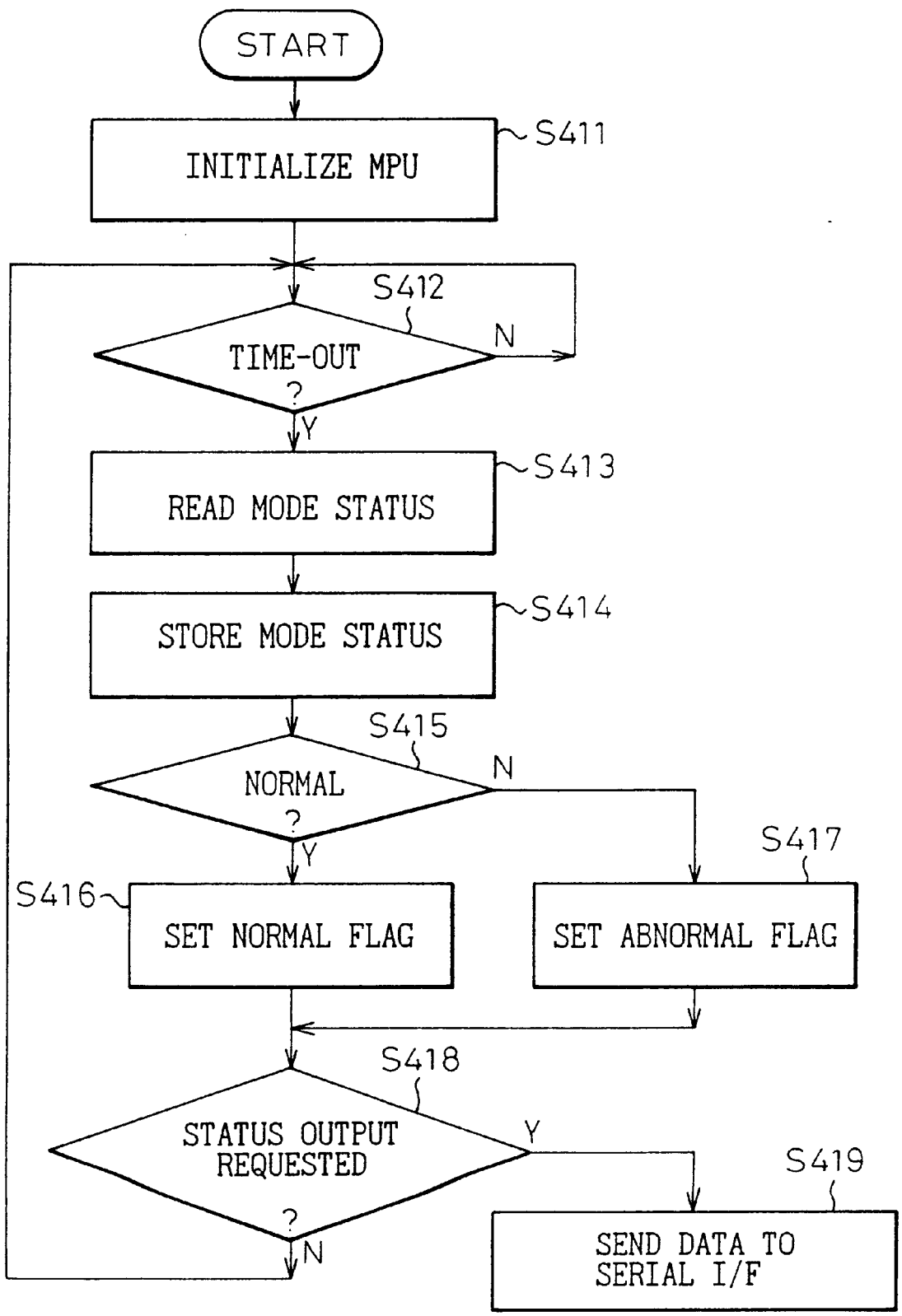
FIG. 11 shows an operational flow of the apparatus of FIG. 9.

FIG. 11 shows an operational flow of the apparatus of FIG. 9.

This flow differs from that of FIG. 8 in steps S413 and S414. Instead of the log of power source voltages of FIG. 8, FIG. 11 stores data relating to an operation mode in such a way as to temporally align the data with the log of power source voltages.

Figure 12:
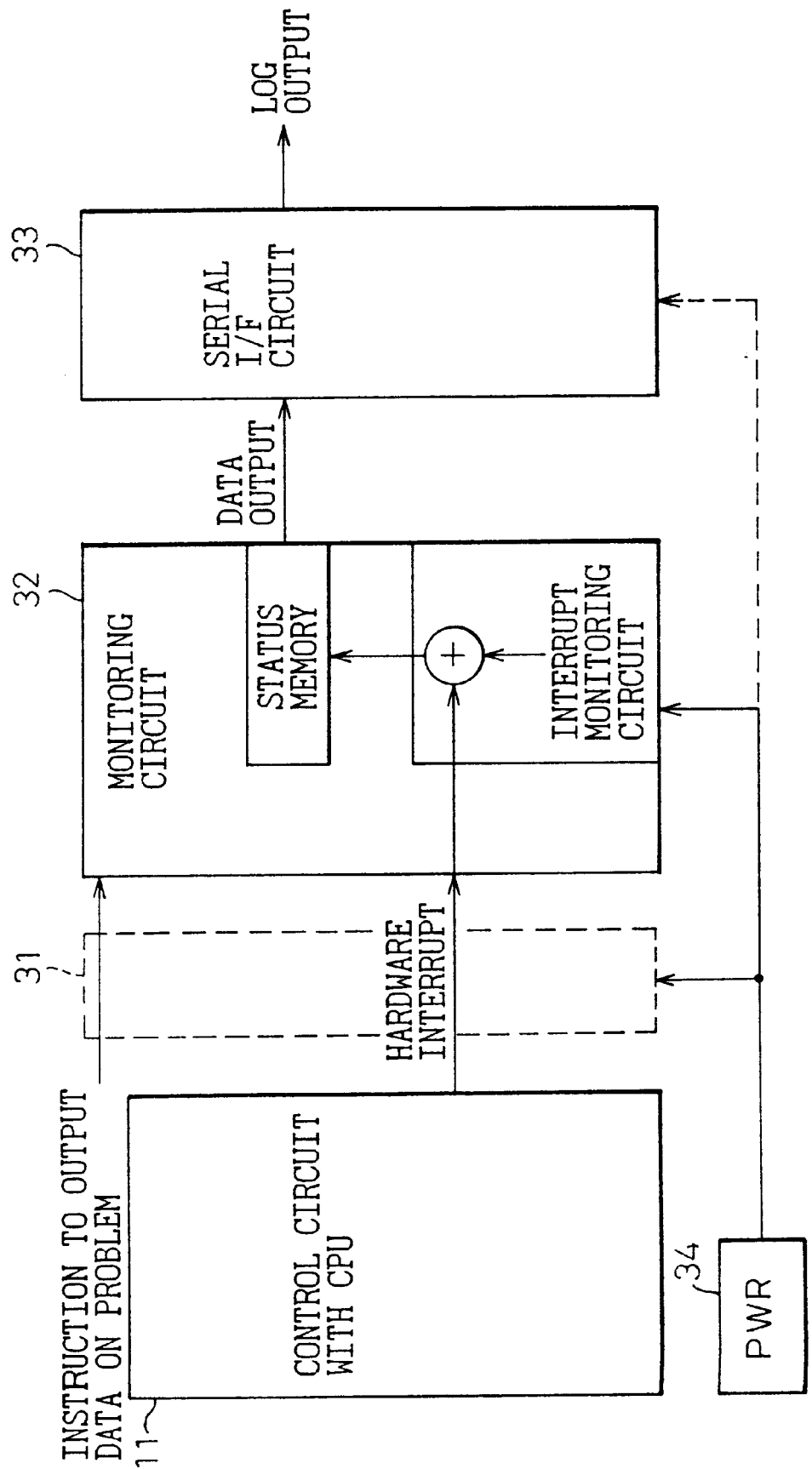
FIG. 12 shows an apparatus for isolating hardware and power source problems according to a third embodiment of the present invention.

FIG. 12 shows an apparatus for isolating hardware and power source problems according to a third embodiment of the present invention. This apparatus is arranged in the terminal 100 of FIG. 5.

Figure 13:
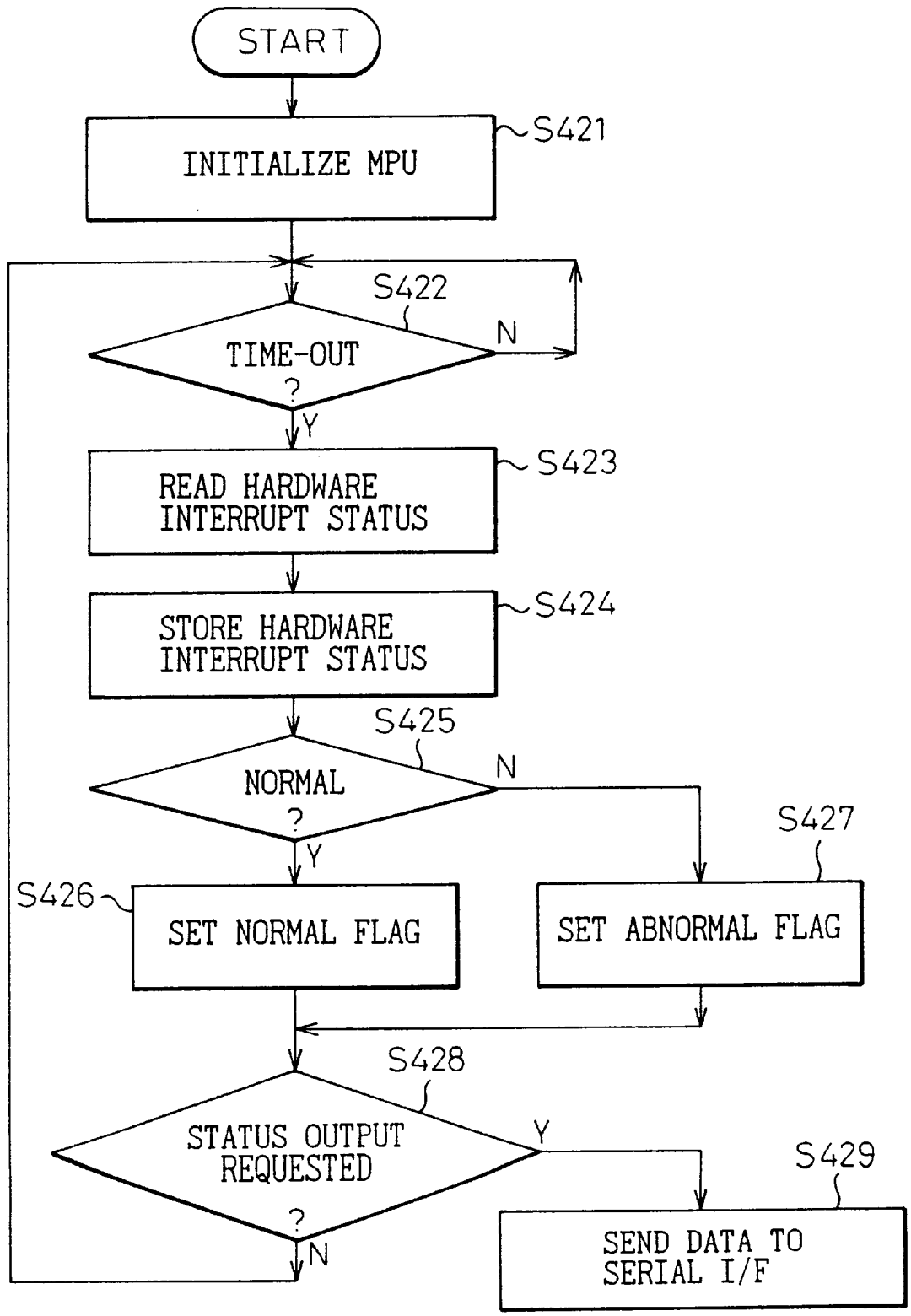
FIG. 13 shows an operational flow of the apparatus of FIG. 12.

FIG. 13 shows an operational flow of the apparatus of FIG. 12.

A monitoring circuit 32 monitors a signal to trigger the suspend operation in the sequence (c) of FIGS. 1 and 2. Such a trigger signal may be an interrupt signal relating to power supply to the control circuit 11, or an interrupt signal generated in response to the operation of hardware in the terminal 100.

In FIG. 12, the control circuit 11 provides the monitoring circuit 32 with interrupt signals. Instead, the monitoring circuit 32 may directly monitor interrupt signals.

Alternatively, the gate array 31 (FIG. 5) may decode only a necessary one of interrupt signals and provide the decoded signal to the monitoring circuit 32.

Various interrupt signals are generated between the control circuit 11 and peripheral devices. These interrupt signals and the sequences thereof may also be monitored to study hardware malfunctions. The functional blocks of the apparatus of FIG. 12 are the same as those of FIG. 10.

The operational flow of FIG. 13 differs from that of FIG. 8 in steps S423 and S424. Although the operational flow of FIG. 13 simply stores an interrupt state, it is actually stored in such a way as to temporally align the interrupt state with the log of power source voltages as well as the data on operation modes mentioned above. In this way, the embodiments may properly be combined together to analyze a problem according to power source voltages, operation modes, and hardware interrupts. The present invention may be combined with the software logging technique of the prior art, to more efficiently study problems.

Figure 14:
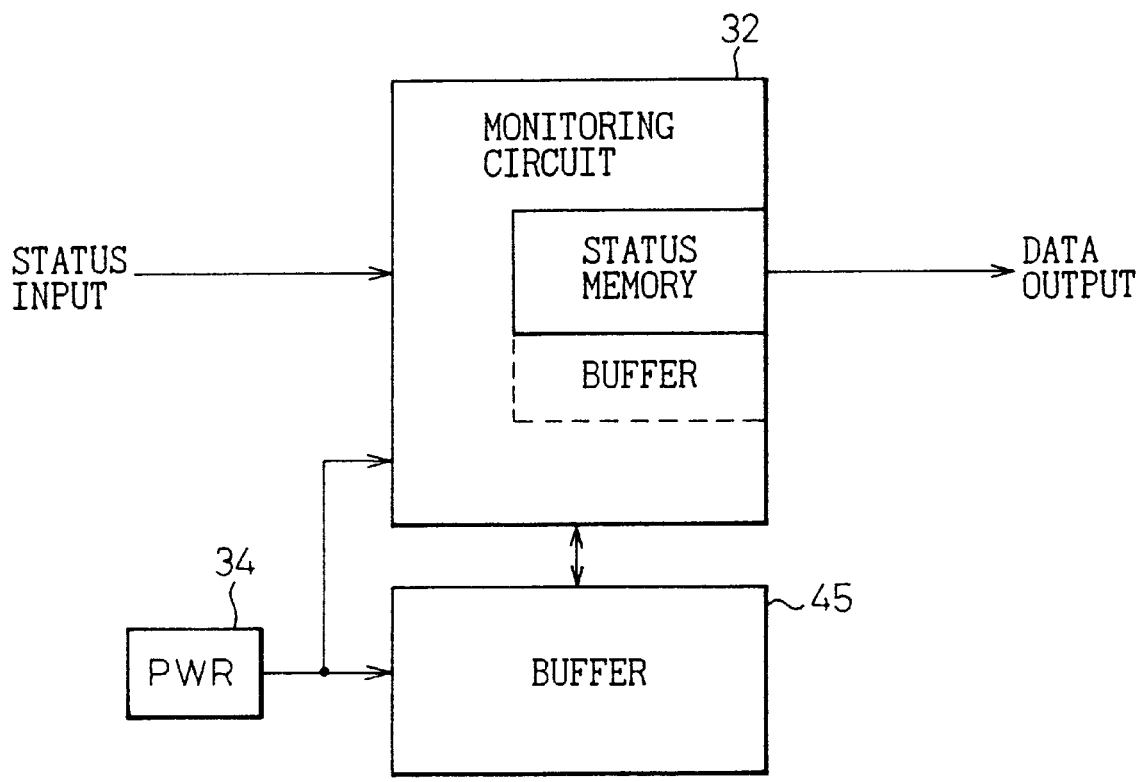
FIG. 14 shows an apparatus for isolating hardware and power source problems according to a fourth embodiment of the present invention.
Figure 15:
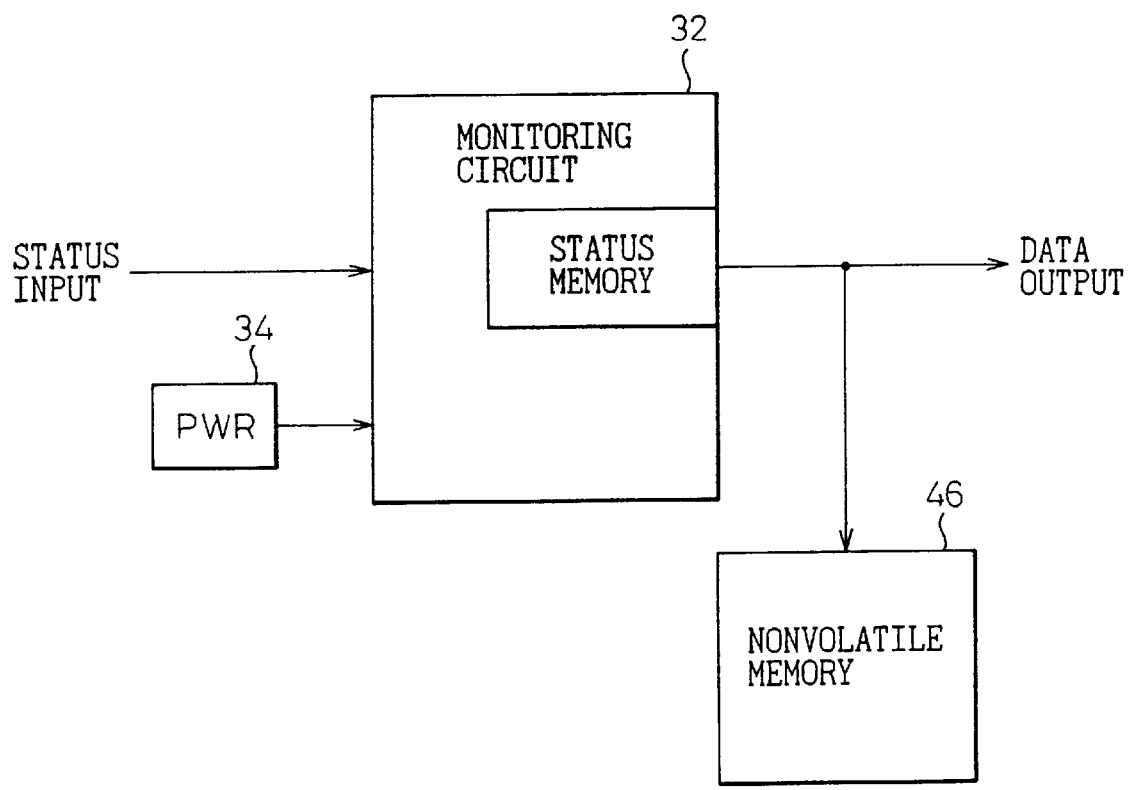
FIG. 15 shows an apparatus for isolating hardware and power source problems according to a fifth embodiment of the present invention.

FIGS. 14 and 15 show apparatuses for isolating hardware and power source problems according to fourth and fifth embodiments of the present invention, respectively. Each of the apparatuses is arranged in the portable terminal 100 of FIG. 5.

The fourth embodiment of FIG. 14 arranges a buffer memory 45 outside a monitoring circuit 32. The buffer memory 45 is energized by the backup power source 34. This embodiment is capable of keeping a log of a variety of hardware information for a long time. The buffer memory 45 may be a large-capacity RAM formed inside the monitoring circuit 32.

The fifth embodiment of FIG. 15 employs a nonvolatile memory 46 such as a flash memory instead of the buffer memory 45 of FIG. 14. The memory 46 does not need the backup power source 34. Accordingly, this embodiment reduces the consumption of a battery, i.e., the backup power source 34 after an occurrence of a problem and prevents data from being lost due to a battery failure.

As explained above, the present invention is capable of isolating and examining problems related to hardware such as a power source of a portable terminal and problems caused by irregular operations by an operator, from problems that are detectable by the software logging technique of the prior art. In particular, the present invention is capable of quickly finding the cause of a problem in a battery of a terminal.

The present invention records, along a time axis, the progress of, for example, a hardware hang-up due to a power source failure caused by the replacement of batteries or the cutting of a power source. It is easy for the present invention to isolate such a problem. The present invention monitors and records the timing and sequences of interrupt signals among internal elements of a terminal, to let the user correctly trace hardware operations that have caused a problem in the terminal.

What is claimed is:

1. An apparatus installed in a device, for isolating a power source problem occurred in the device, comprising:

monitoring means for monitoring and measuring voltages of power sources of the device;

memory means for storing a log of the voltages measured by the monitoring means;

output means for providing the log of measured voltages outside of the device to analyze a hazard thereof; and control means for controlling the monitoring means, memory means, and output means and providing the log of measured voltages outside of the device in response to a request, the monitoring means, memory means, output means, and control means being energized by a backup power source of the device.

2. The apparatus of claim 1, wherein:

the monitoring means monitors and collects data on operation modes, in particular, power-saving modes of the device;

the memory means stores the data on operation modes in such a way as to temporally align the data on operation modes with the log of measured voltages; and the output means provides the log of measured voltages and the data on operation modes outside of the device in response to an instruction from the control means.

3. The apparatus of claim 1, wherein:

the monitoring means monitors and collects data on hardware interrupts that occurs in the device to switch the operation modes, in particular, power-saving modes of the device from one to another;

the memory means stores the data on hardware interrupts in such a way as to temporally align the data on hardware interrupts with the log of measured voltages; and the output means provides the log of measured voltages and the data on hardware interrupts outside of the device in response to an instruction from the control means.

4. The apparatus of claim 3, wherein the data on hardware interrupts control the operation of hardware in the device.

5. An apparatus installed in a device, for isolating a hardware problem occurred in the device, comprising:

monitoring means for monitoring and collecting data on interrupts that control the operation of hardware of the device;

memory means for storing a log of the data on interrupts;

output means for providing the log of data on interrupts outside of the device to analyze a hazard thereof; and control means for controlling the monitoring means, memory means, and output means providing the log of data on interrupts outside of the device in response to a request, the monitoring means, memory means, output means, and control means being energized by a backup power source of the device.

6. The apparatus of claim 5, wherein the memory means has a buffer circuit for storing the log of data on interrupts in problems and failure occurring sequences.

7. The apparatus of claim 6, wherein the buffer circuit is a RAM.

8. The apparatus of claim 6, wherein the buffer circuit is a nonvolatile memory.

9. A method of isolating a power source problem occurred in a device, comprising the steps of:

monitoring and measuring voltages of power sources of the device;

storing a log of the measured voltages;

providing the log of measured voltage outside of the device to analyze a hazard thereof in response to a predetermined instruction;

monitoring and collecting data on operation modes, in particular, power-saving modes of the device;

storing the data on operation modes in such a way as to temporally align the data on operation modes with the log of measured voltages; and providing the log of measured voltages and the data on operation modes outside of the device to analyze a hazard thereof in response to a predetermined instruction.

10. A method of isolating a power source problem occurred in a device, comprising the steps of:

monitoring and measuring voltages of power sources of the device;

storing a log of the measured voltages;

providing the log of measured voltage outside of the device to analyze a hazard thereof in response to a predetermined instruction;

monitoring and collecting data on hardware interrupts that occur in the device to switch the operation modes and, in particular, power-saving modes of the device from one to another;

storing the data on hardware interrupts in such a way as to temporally align the data on hardware interrupts with the log of measured voltages; and providing the log of measured voltages and the data on hardware interrupts outside of the device in response to a predetermined instruction.

11. The method of claim 10, wherein the data on hardware interrupts control the operation of hardware in the device.

\* \* \* \* \*